United States Patent
Yamazaki

(10) Patent No.: US 10,235,109 B2
(45) Date of Patent: Mar. 19, 2019

(54) PRINTING SYSTEM TO REDUCE PRINT ERROR IN PERFORMING OUTPUT PROCESSING BASED ON DATA

(71) Applicant: CANON KABUSHIKI KAISHA, Tokyo (JP)

(72) Inventor: Masahito Yamazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/493,018

(22) Filed: Apr. 20, 2017

(65) Prior Publication Data

US 2017/0308339 A1 Oct. 26, 2017

(30) Foreign Application Priority Data

Apr. 25, 2016 (JP) ................. 2016-087440

(51) Int. Cl.
*G06F 3/12* (2006.01)
*H04N 1/00* (2006.01)
*H04N 1/21* (2006.01)

(52) U.S. Cl.
CPC .......... *G06F 3/1237* (2013.01); *G06F 3/1204* (2013.01); *G06F 3/1211* (2013.01); *G06F 3/1218* (2013.01); *G06F 3/1222* (2013.01); *G06F 3/1234* (2013.01); *G06F 3/1236* (2013.01); *G06F 3/1238* (2013.01); *G06F 3/1273* (2013.01); *G06F 3/1286* (2013.01); *H04N 1/00244* (2013.01); *H04N 1/2166* (2013.01); *H04N 2201/0094* (2013.01)

(58) Field of Classification Search
None
See application file for complete search history.

(56) References Cited

U.S. PATENT DOCUMENTS

2010/0332823 A1* 12/2010 Tsujimoto ............. G06F 21/629
713/155
2013/0050751 A1* 2/2013 Fukushima ........ H04N 1/00222
358/1.15

FOREIGN PATENT DOCUMENTS

JP 2006069117 A 3/2006

* cited by examiner

*Primary Examiner* — Barbara D Reinier
(74) *Attorney, Agent, or Firm* — Canon U.S.A., Inc. IP Division

(57) ABSTRACT

A printing system includes at least one processor that acts as a storing unit and a determination unit. The storing unit causes history data about a print job to be stored into storage. The determination unit determines whether to cause a user to perform confirmation processing at a time of printing based on the history data about the print job that is stored in the storage.

14 Claims, 11 Drawing Sheets

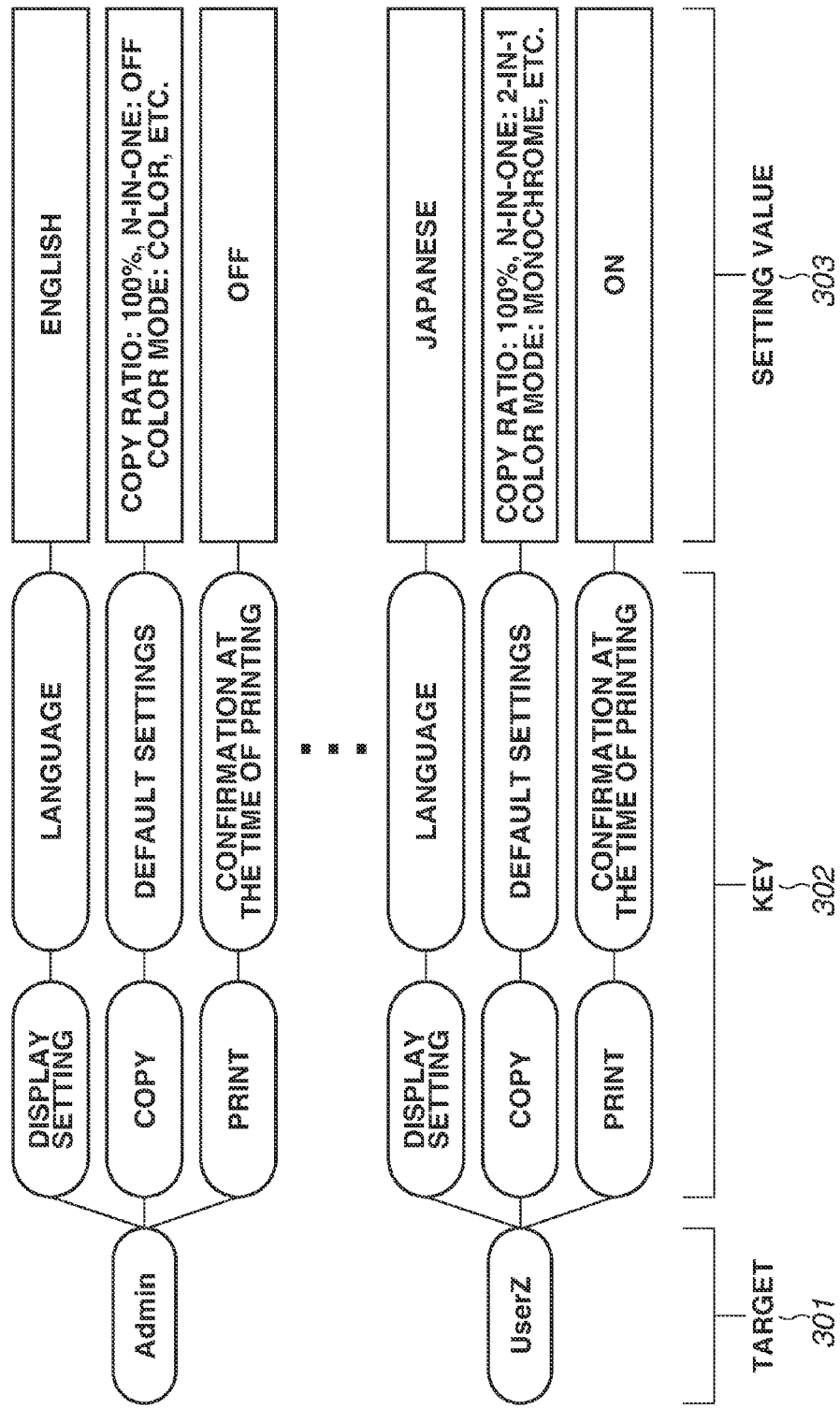

FIG. 8A  JOB HISTORIES OF TARGET USER

| JOB ID | INPUT DATE AND TIME | FILENAME | EXECUTION RESULT | PRINT SETTINGS |
|---|---|---|---|---|
| 0315 | MARCH 15, 2016 AT 12:00 | EXPLANATORY MATERIAL.docx | CANCELED HALFWAY | COLOR, 1-IN-1 ... |
| 0317 | MARCH 15, 2016 AT 12:03 | EXPLANATORY MATERIAL.docx | OK | MONOCHROME, 2-IN-1 ... |
| 0318 | MARCH 15, 2016 AT 12:06 | EXPLANATORY MATERIAL.docx | OK | MONOCHROME, 2-IN-1 ... |
| 0321 | MARCH 15, 2016 AT 12:12 | EXPLANATORY MATERIAL v2.docx | OK | MONOCHROME, 2-IN-1 ... |
| ... | ... | ... | ... | ... |
| 0617 | APRIL 1, 2016 AT 12:03 | readme.txt | OK | MONOCHROME, 1-IN-1 ... |
| 0618 | APRIL 1, 2016 AT 12:06 | readme.txt | OK | MONOCHROME, 1-IN-1 ... |
| 0700 | APRIL 6, 2016 AT 12:06 | EXPLANATORY MATERIAL.docx | OK | MONOCHROME, 2-IN-1 ... |

20 JOB HISTORIES

FIG. 8B  EXTRACTION OF OVERLAPPING JOB HISTORIES

| JOB ID | EXECUTION DATE AND TIME | FILENAME | EXECUTION RESULT | PRINT SETTINGS |
|---|---|---|---|---|
| 0315 | MARCH 15, 2016 AT 12:00 | EXPLANATORY MATERIAL.docx | CANCELED HALFWAY | COLOR, 1-IN-1 ... |
| 0317 | MARCH 15, 2016 AT 12:03 | EXPLANATORY MATERIAL.docx | OK | MONOCHROME, 2-IN-1 ... |
| 0318 | MARCH 15, 2016 AT 12:06 | EXPLANATORY MATERIAL.docx | OK | MONOCHROME, 2-IN-1 ... |
| ... | ... | ... | ... | ... |
| 0617 | APRIL 1, 2016 AT 12:03 | readme.txt | OK | MONOCHROME, 1-IN-1 ... |
| 0618 | APRIL 1, 2016 AT 12:06 | readme.txt | OK | MONOCHROME, 1-IN-1 ... |
| 0700 | APRIL 6, 2016 AT 12:06 | EXPLANATORY MATERIAL.docx | OK | MONOCHROME, 2-IN-1 ... |

FIG. 8C TABLE IN WHICH JOB HISTORIES HAVING SAME FILENAME ARE EXTRACTED (1)

| JOB ID | EXECUTION DATE AND TIME | FILENAME | ... | EXECUTION RESULT | PRINT SETTINGS |
|---|---|---|---|---|---|
| 0315 | MARCH 15, 2016 AT 12:00 | EXPLANATORY MATERIAL.docx | ... | CANCELED HALFWAY | COLOR, 1-IN-1 ... |
| 0317 | MARCH 15, 2016 AT 12:03 | EXPLANATORY MATERIAL.docx | ... | OK | MONOCHROME, 2-IN-1 ... |
| 0318 | MARCH 15, 2016 AT 12:06 | EXPLANATORY MATERIAL.docx | ... | OK | MONOCHROME, 2-IN-1 ... |
| 0700 | APRIL 6, 2016 AT 12:06 | EXPLANATORY MATERIAL.docx | ... | OK | MONOCHROME, 2-IN-1 ... |

(2)

| JOB ID | EXECUTION DATE AND TIME | FILENAME | ... | EXECUTION RESULT | PRINT SETTINGS |
|---|---|---|---|---|---|
| 0617 | APRIL 1, 2016 AT 12:03 | readme.txt | ... | OK | MONOCHROME, 1-IN-1 ... |
| 0618 | APRIL 1, 2016 AT 12:06 | readme.txt | ... | OK | MONOCHROME, 1-IN-1 ... |

PRINTING SYSTEM TO REDUCE PRINT ERROR IN PERFORMING OUTPUT PROCESSING BASED ON DATA

BACKGROUND OF THE INVENTION

Field of the Invention

This disclosure relates to printing in which output processing is performed based on data input from an external apparatus.

Description of the Related Art

Some conventional printing apparatuses are connected to networks and are capable of receiving print data from information processing apparatuses via the networks to print the received print data. It has been conventionally known to generate the print data to be transmitted to the printing apparatus with use of a printer driver (or a print application) designed to allow use of the individual printing apparatus. A user can configure settings, such as the number of copies, a size of an output sheet, a color setting, a setting of double-sided printing, and N-in-one printing, via the printer driver to acquire a desired output product.

There has been known a confirmation function for preventing or reducing print errors due to a setting error or a misunderstanding by the user. For example, Japanese Patent Application Laid-Open No. 2006-069117 discusses a printing apparatus equipped with a test printing function with which the user prints one copy by way of trial when intending to print a plurality of copies. The printing apparatus discussed in Japanese Patent Application Laid-Open No. 2006-069117 allows the user to issue an instruction to start the printing or an instruction to cancel the printing after confirming one output product, thereby succeeding in reducing wasteful outputs due to the print setting error. Besides that, there has also been an apparatus equipped with a preview function of presenting a preview of an image of the output before actually printing the image.

SUMMARY OF THE INVENTION

According to an aspect of the present invention, a printing system includes at least one processor, the at least one processor which acts as a storing unit configured to cause history data about a print job to be stored into storage, and a determination unit configured to determine whether to cause a user to perform confirmation processing at a time of printing based on the history data about the print job that is stored in the storage.

Further features of the present invention will become apparent from the following description of embodiments with reference to the attached drawings.

BRIEF DESCRIPTION OF THE DRAWINGS

FIG. 3 illustrates a database of individual setting information for each user.

FIGS. 8A to 8C illustrate a flow of processing for determining an evaluation value.

DESCRIPTION OF THE EMBODIMENTS

In the following description, embodiments will be described in detail with reference to the drawings. However, the embodiments that will be described below are not intended to be limiting, and further, not all of combinations of features that will be described in the embodiments are necessarily essential to a solution.

One conceivable method to prevent or reduce print errors due to a setting error or a misunderstanding by a user is to make a confirmation such as test printing and a preview for all print operations, thereby preventing or reducing output errors in an entire apparatus.

However, a rate of occurrence of the output error due to the setting error or the misunderstanding is different depending on the user's characteristic, the frequency of the printing performed by the user, and/or the like. For example, a careful user and a user who frequently uses the apparatus for routine work are considered to rarely make the setting error. On the other hand, a careless user, a user who less frequently uses the apparatus and is unfamiliar with an operation, and the like are considered to relatively highly likely make the print setting error.

Then, there lies such an issue that, if the apparatus is configured to make the confirmation such as the test printing and the preview for all print operations regardless of the characteristics and the use frequency for each user, this leads to forcing the confirmation even on the user who rarely makes the setting error, thereby undesirably impairing the user's convenience.

In light of these circumstances, the following embodiments are constructed to allow the printing apparatus to switch whether to cause the user to perform a confirmation operation for each user based on the user's print histories.

Figure 1:
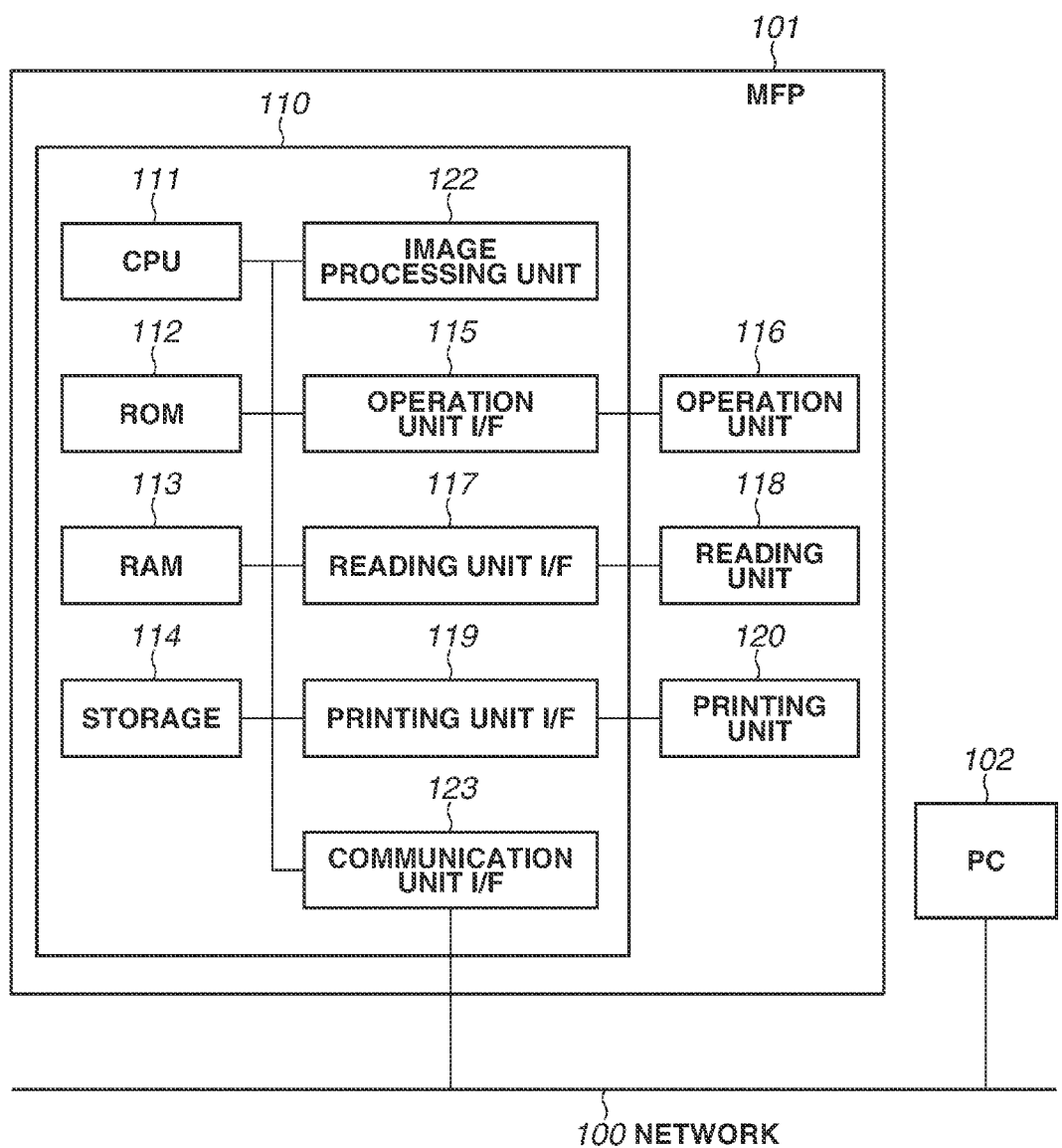
FIG. 1 is a block diagram illustrating a configuration of a printing system.

A first embodiment is described below. FIG. 1 illustrates an entire printing system. A multi function peripheral (MFP) 101 and a personal computer (PC) 102 are connected communicably with each other in a network 100. The MFP 101 is one example of a printing apparatus, and the PC 102 is one example of an information processing apparatus.

The PC 102 will be described. A printer driver having a function of generating print data corresponding to the MFP 101 is installed in the PC 102. A user who wants to print some data can issue a print instruction from various applications and the like. The printer driver installed in the PC 102 can convert data output from the application into the print data interpretable by the MFP 101 and transmit the print data to the MFP 101 connected to the network 100 based on the print instruction.

In the present embodiment, the PC is exemplarily described as one example of the information processing apparatus, but the information processing apparatus may be, a mobile information terminal, such as a smart-phone and a tablet terminal. The method for transmitting the print data to an image forming apparatus can be modified as appropriate. The PC 102 may be configured to transmit the print data to the image forming apparatus via an application or a driver for printing, or may be configured to transmit the print data to the image forming apparatus via a cloud server. The PC 102 may be configured to transmit the print data to the image forming apparatus with use of a wireless communication method.

The MFP 101 will be descried. The MFP 101 has functions of, for example, printing the received print data, transmitting an electronic mail, and copying a document.

In the present embodiment, the MFP 101 will be described as one example of the printing apparatus, but the printing apparatus is not limited thereto. For example, the printing apparatus may be a single function peripheral (SFP) having a function of printing an image onto a sheet, such as a single-function printing apparatus.

A control unit 110 including a central processing unit (CPU) 111 controls an operation of the entire MFP 101. The CPU 111 reads out a control program stored in a read only memory (ROM) 112 or storage 114, and performs various kinds of control, such as reading control and print control. The ROM 112 stores a control program executable by the CPU 111. A random access memory (RAM) 113 is a main storage memory of the CPU 111, and is used as a temporary storage area for developing various kinds of control programs stored in a work area, the ROM 112, and the storage 114. The storage 114 stores the print data, image data, various programs, and various kinds of setting information.

In the present embodiment, an auxiliary storage device, such as a hard disk drive (HDD), is assumed to serve as the storage 114, but the MFP 101 may be configured to use a nonvolatile memory, such as a solid state drive (SSD), instead of the HDD.

The MFP 101 according to the present embodiment is assumed to be configured in such a manner that the single CPU 111 performs each of processing procedures illustrated in flowcharts described below with use of a single memory (the RAM 113), but may be configured in a different manner. For example, the MFP 101 also can be configured to cause a plurality of CPUs, RAMS, ROMs, and storages to cooperate with one another to perform each of the processing procedures illustrated in the flowcharts described below.

An operation unit interface (I/F) 115 connects the operation unit 116 and the control unit 110 to each other. The operation unit 116 functions as a reception unit that receives an instruction from the user. The operation unit 116 also functions as a display unit that displays an operation screen to the user.

A reading unit I/F 117 connects a reading unit 118 and the control unit 110 to each other. The reading unit 118 reads an image on a document and generates image data. Assume that the generated image data is stored into the storage 114 or the RAM 113. The image data generated by the reading unit 118 is, for example, transmitted to an external apparatus and/or printed onto a sheet.

A printing unit I/F 119 connects a printing unit 120 and the control unit 110 to each other. An image to be used in the printing is transferred from the control unit 110 to the printing unit 120 via the printing unit I/F 119. The printing unit 120 receives a control command and the image to be printed via the control unit 110, and prints this image onto a sheet. A printing method employed by the printing unit 120 may be the electrophotographic method or may be the inkjet method. The printing method employed by the printing unit 120 may be another method (for example, the thermal transfer method) as long as the method can print the image onto the sheet.

The control unit 110 is connected to the network 100 via a communication unit interface (I/F) 123. The communication unit I/F 123, for example, transmits an image and information to and receives the print data and information from the information processing apparatus in the network 100.

The print data received via the communication unit I/F 123 is analyzed by a page description language (PDL) analysis unit (not illustrated), which is a software module for analyzing the print data. The PDL analysis unit analyzes the print data expressed in various kinds of PDLs stored in the storage 114 or the RAM 113, and generates intermediate codes. The intermediate codes generated by the PDL analysis unit are converted into image data by a raster image processor (RIP, not illustrated) of an image processing unit 122.

The image processing unit 122 performs image processing on the image data read by the reading unit 118 and the image data to be transferred to the printing unit 120.

<User Management>

Figure 2:
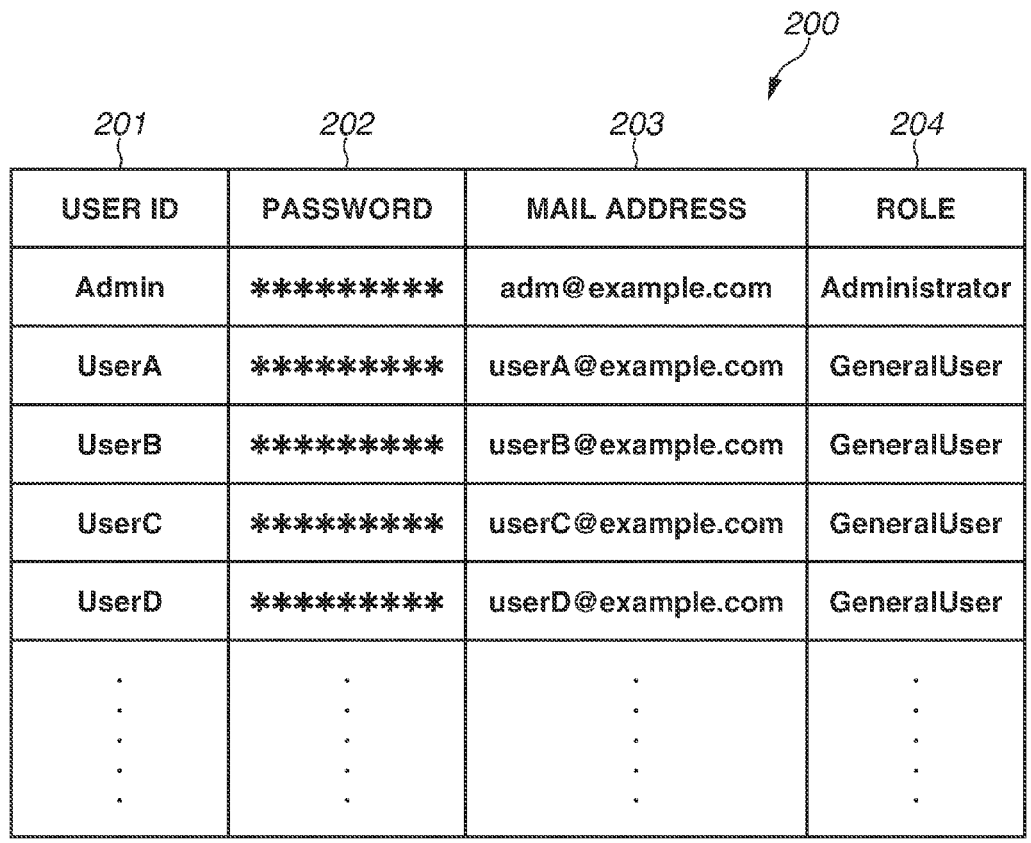
FIG. 2 illustrates a user management table in a printing apparatus.

User management in the MFP 101 will be described. FIG. 2 illustrates one example of user management data stored in the storage 114 of the MFP 101. User management data 200 is information for managing users who use the MFP 101, and includes a user identification (ID) 201, a password 202, a mail address 203, and a role 204. Besides them, the user management data 200 may also include other management data, such as a username, an identification number for authenticating an ID card, and notification information of which the user will be notified when logging in.

The user ID 201 is a user ID uniquely indicating the user. The password 202 indicates a password for authenticating the user. The mail address 203 is an electronic mail address associated with the user.

The role 204 is information indicating authority assigned to the user. FIG. 2 illustrates, by way of example, two types of authority, "Administrator", which indicates that the user as "Administrator" has access to management of the MFP 101, and "GeneralUser", which indicates that the user as "GeneralUser" is a general user of the MFP 101. For example, the user with his/her role set to "Administrator" can, for example, access to management settings of the MFP 101. Hereinafter, the user with his/her role set to "Administrator" will be referred to as an administrator.

<Application of Individual Settings>

In the present embodiment, settings of the MFP 101 can be switched for each of the users. Hereinafter, switching the settings for each of the users will be referred to as personalization processing. The personalization processing is performed based on a database of individual setting information stored in the storage 114.

The user can preregister the individual setting information to be used in using the MFP 101. The individual setting information includes setting information, such as a language that this user uses and initial settings when this user uses the copy function.

FIG. 3 illustrates one example of the database of the individual setting information. The user ID for identifying a type of the user is stored in a target 301.

A key 302 is information for identifying a setting item, and a setting value 303 is a setting value corresponding to the setting item. The CPU 111 can acquire or change the setting value 303 by combining the target 301 and the key 302 and searching the database based thereon.

For example, in the present embodiment, the language on a screen to be displayed after the login can be set for each user logged in. Further, the initial settings when the user uses the copy function also can be set for each of the users.

Further, when receiving the print data from the information processing apparatus, such as the PC 102, and carrying out a print job based on the print data, the MFP 101 can change whether to perform confirmation processing at the time of the printing for each user who has input the print data.

<Confirmation Function at the Time of Printing>

Next, execution of the print job based on the print data will be described. Upon receiving the print data transmitted from the PC 102 or the like, the MFP 101 stores the received print data into the storage 114. The user can carry out the printing based on the print data stored in the storage 114 by selecting a hold printing function via a main menu (not illustrated) to be displayed on the operation unit 116. A list of pieces of print data stored in the storage 114 is displayed on a screen of the hold printing function (not illustrated). The user can start the printing by selecting data that he/she wishes to print and issuing an instruction to start the printing. A specific method for print control will be described with reference to flowcharts, which will be focused on below.

With the instruction to start the printing having been issued by the user, the MFP 101 carries out the function of making the confirmation at the time of the printing if the setting, of the confirmation at the time of the printing, that corresponds to the user associated with this print data is set to ON.

Figure 4A:
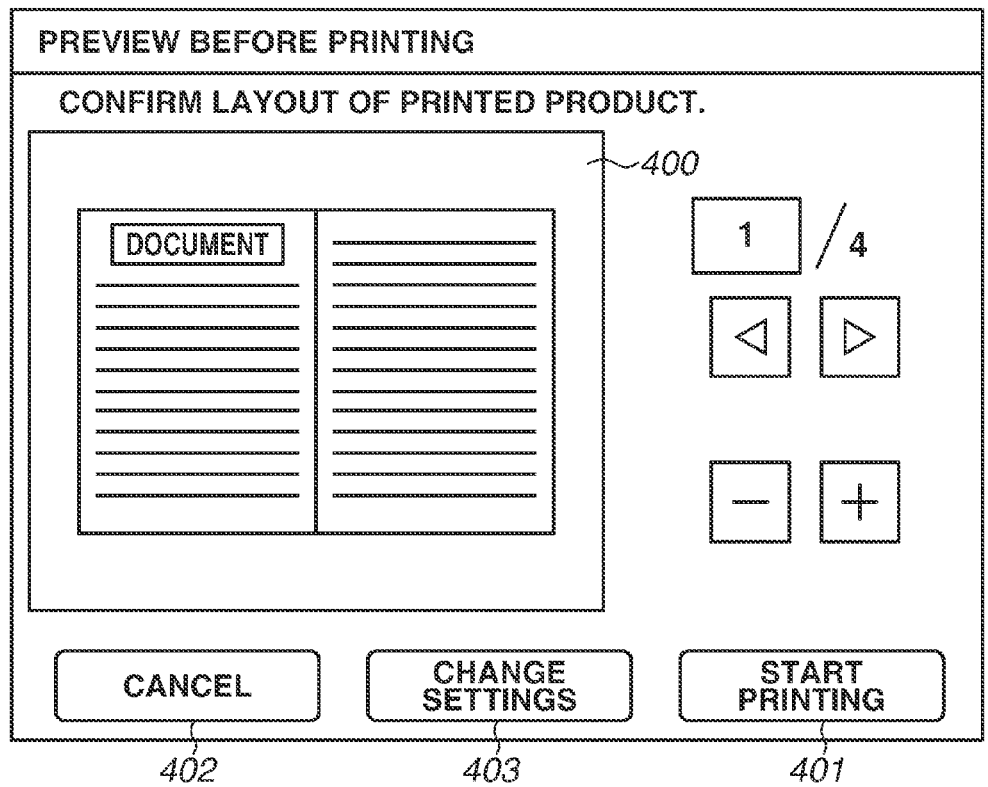
FIGS. 4A and 4B each illustrate one example of a screen displayed on an operation unit.
Figure 4B:
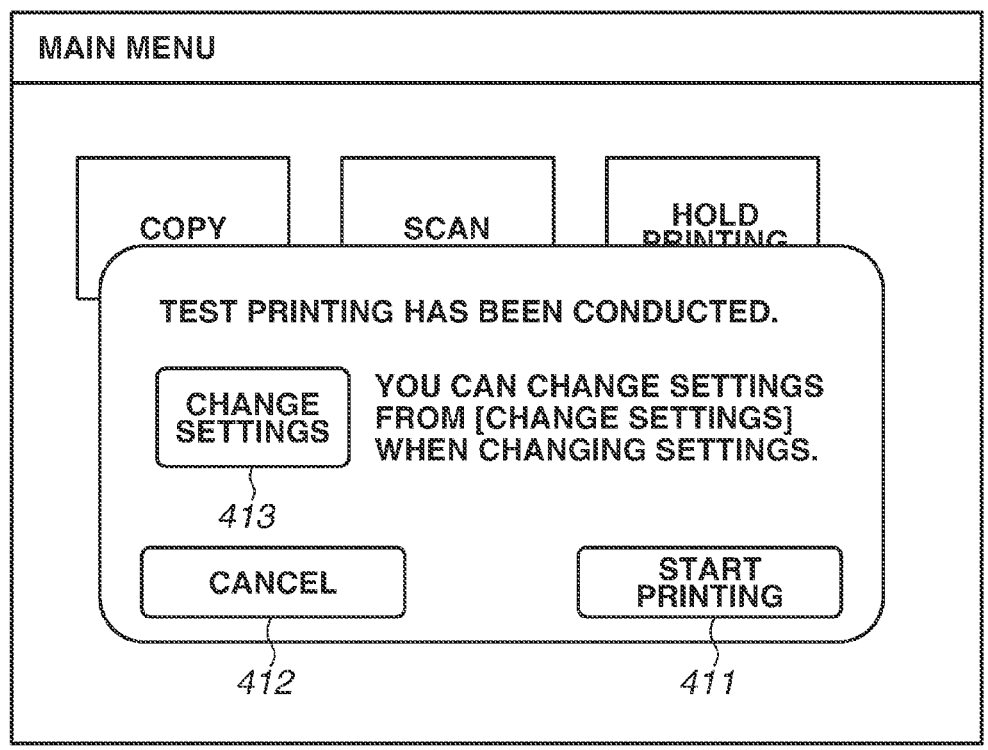

The function of making the confirmation at the time of the printing will be described. FIGS. 4A and 4B each illustrate one example of the function of making the confirmation at the time of the printing, and FIG. 4A illustrates a screen of a preview function for a user to confirm a layout of a printed product before the printing.

The preview function will be described with reference to FIG. 4A. A region 400 is a preview region, and a preview image is displayed so as to allow the user to confirm an image of a print result in advance. A print start key 401 is used by a user to start the printing. A cancel key 402 is used by a user to cancel the printing.

A setting change key 403 is used by a user to change the print settings. For example, the setting change key 403 allows the user to change the N-in-one setting and the setting regarding the double-sided printing.

FIG. 4B illustrates another example of the function of making the confirmation at the time of the printing. FIG. 4B illustrates a screen of a test printing function, with which the user prints one copy by way of trial when intending to print a plurality of copies.

The user can first print only one copy and then determine whether to advance the printing via the operation unit 116 after confirming a print result thereof by using the test printing function. A print start key 411 is used by a user to start the printing, and a cancel key 412 is used by a user to cancel the printing. Further, a setting change key 413 is used by a user to change the print settings. For example, the setting change key 413 allows the user to change the N-in-one setting and the setting regarding the double-sided printing.

Now, one conceivable method to prevent print errors due to a setting error or a misunderstanding by the user before these errors happen is to perform the confirmation processing such as the test printing illustrated in FIG. 4B and the preview illustrated in FIG. 4A for the printing of all of the users.

However, a rate of occurrence of the output error due to the setting error or the misunderstanding is considered to be different depending on the user's characteristic, a frequency at which the user uses the apparatus, and/or the like. For example, a careful user and a user who frequently uses the apparatus for routine work are considered to rarely make the setting error. On the other hand, a careless user, a user who less frequently uses the apparatus and is unfamiliar with an operation, and the like are considered to relatively highly likely make the print setting error.

Then, there lies such an issue that, if the MFP 101 is configured to make the confirmation such as the test printing and the preview for the all print operations regardless of the characteristics and the use frequency for each of the users, this leads to forcing the confirmation even on the user who rarely makes the setting error, thereby undesirably impairing the user's convenience.

In light of these circumstances, in the present embodiment, switching whether to cause the user to perform the confirmation processing for each of the users will be described. In the present embodiment, the database of the individual setting information is configured to be able to store a setting value of the function of the confirmation at the time of the printing for each of the users as described with reference to FIG. 3. In the present embodiment, the MFP 101 is configured to allow the administrator to change the language setting, the initial settings of the copy function, and the setting of the function of the confirmation at the time of the printing, for each of the users that are contained in the database of the individual setting information via a setting screen for the administrator (not illustrated).

These configurations allow the administrator of the MFP 101 to change whether to perform the confirmation processing at the time of the printing for each of the users via the setting screen (not illustrated). Accordingly, whether or not to perform the confirmation processing at the time of the printing is flexibly switched for each of the users. Subsequently, in the present embodiment, a mechanism capable of switching based on previous print histories of the user whether to cause this user to perform the confirmation processing will be described.

Specific control of the MFP 101 will be described with reference to flowcharts illustrated in FIGS. 5 to 7.

Figure 5:
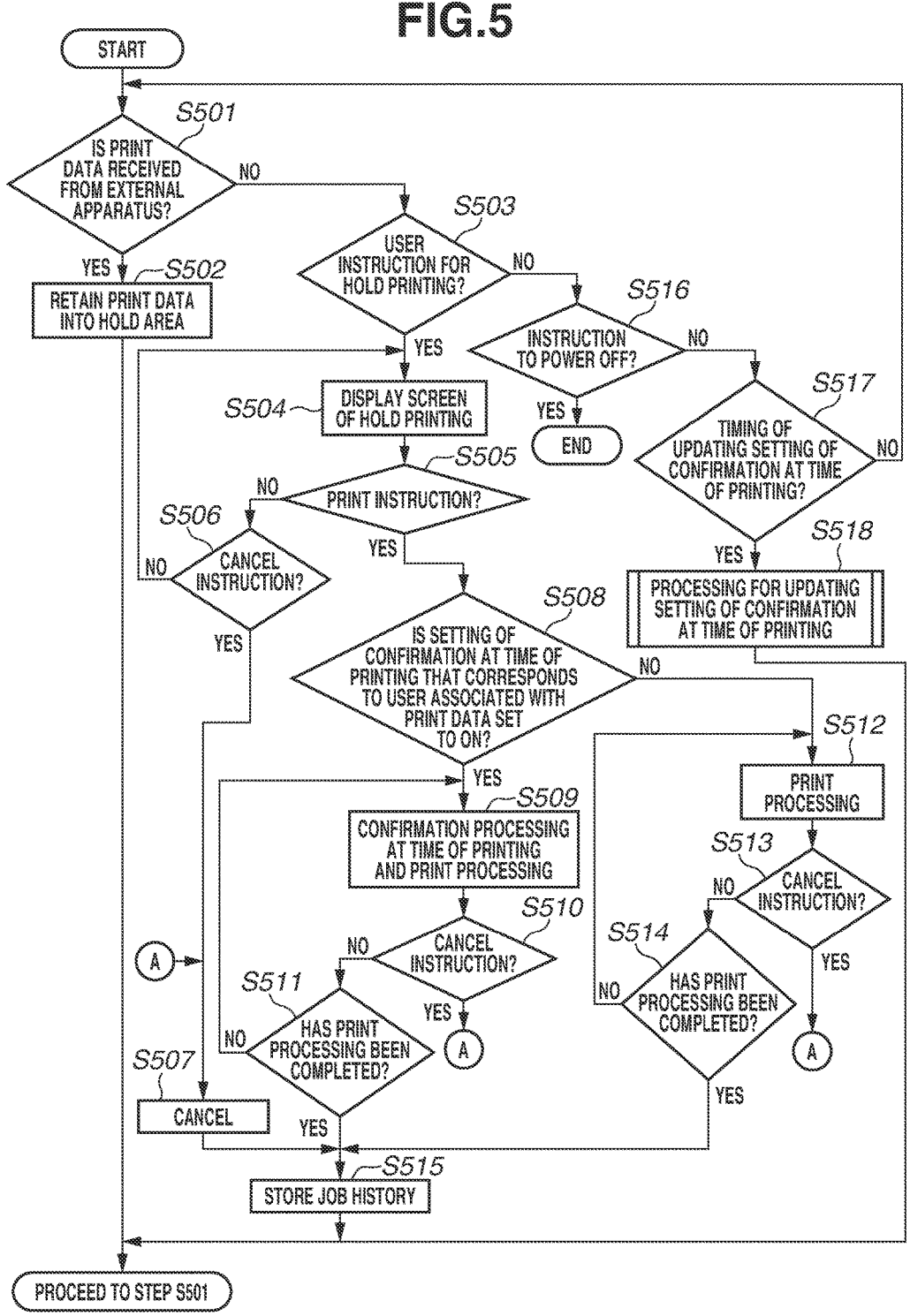
FIG. 5 is a flowchart illustrating control of the printing apparatus.
Figure 6:
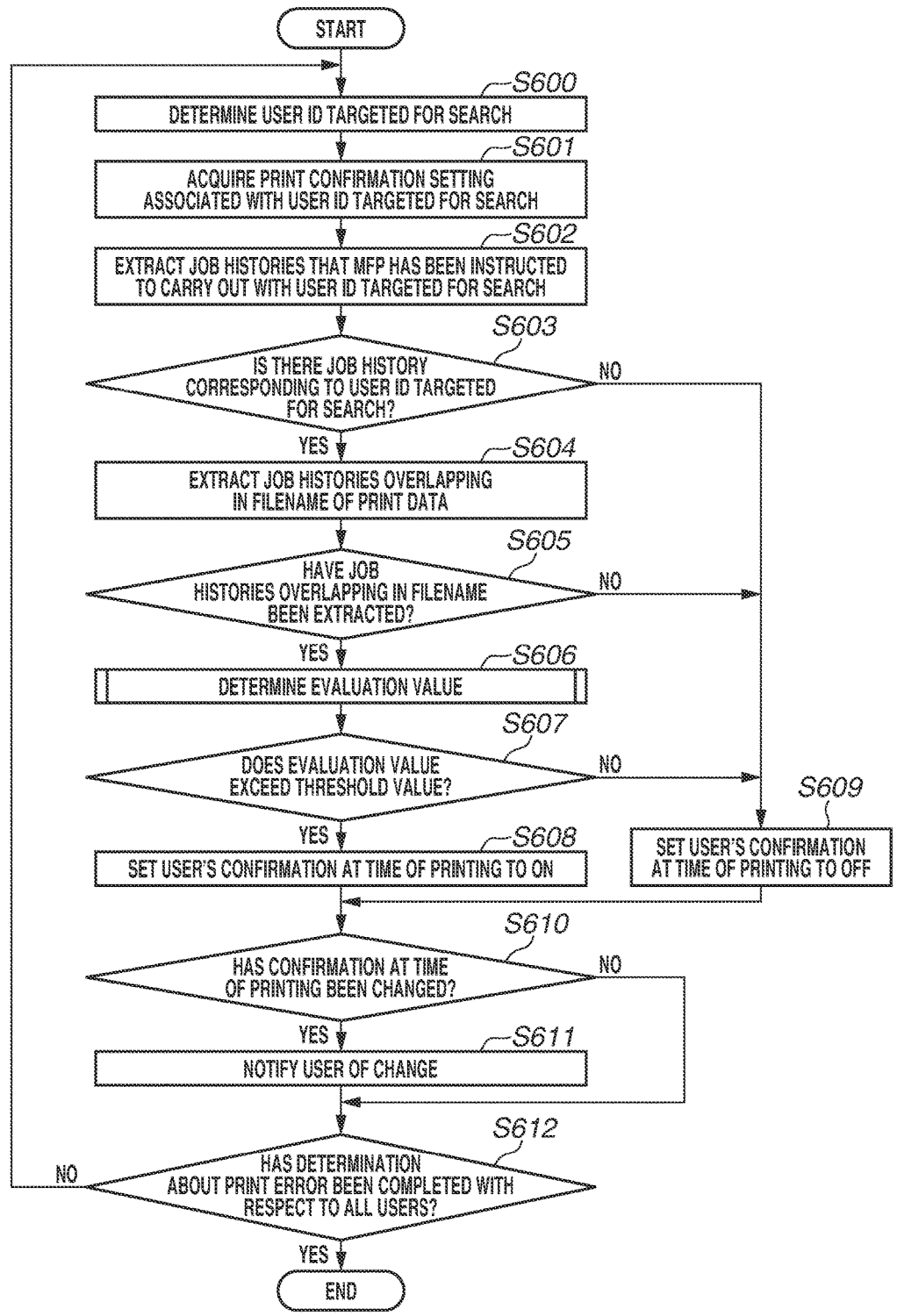
FIG. 6 is a flowchart illustrating control of the printing apparatus.
Figure 7:
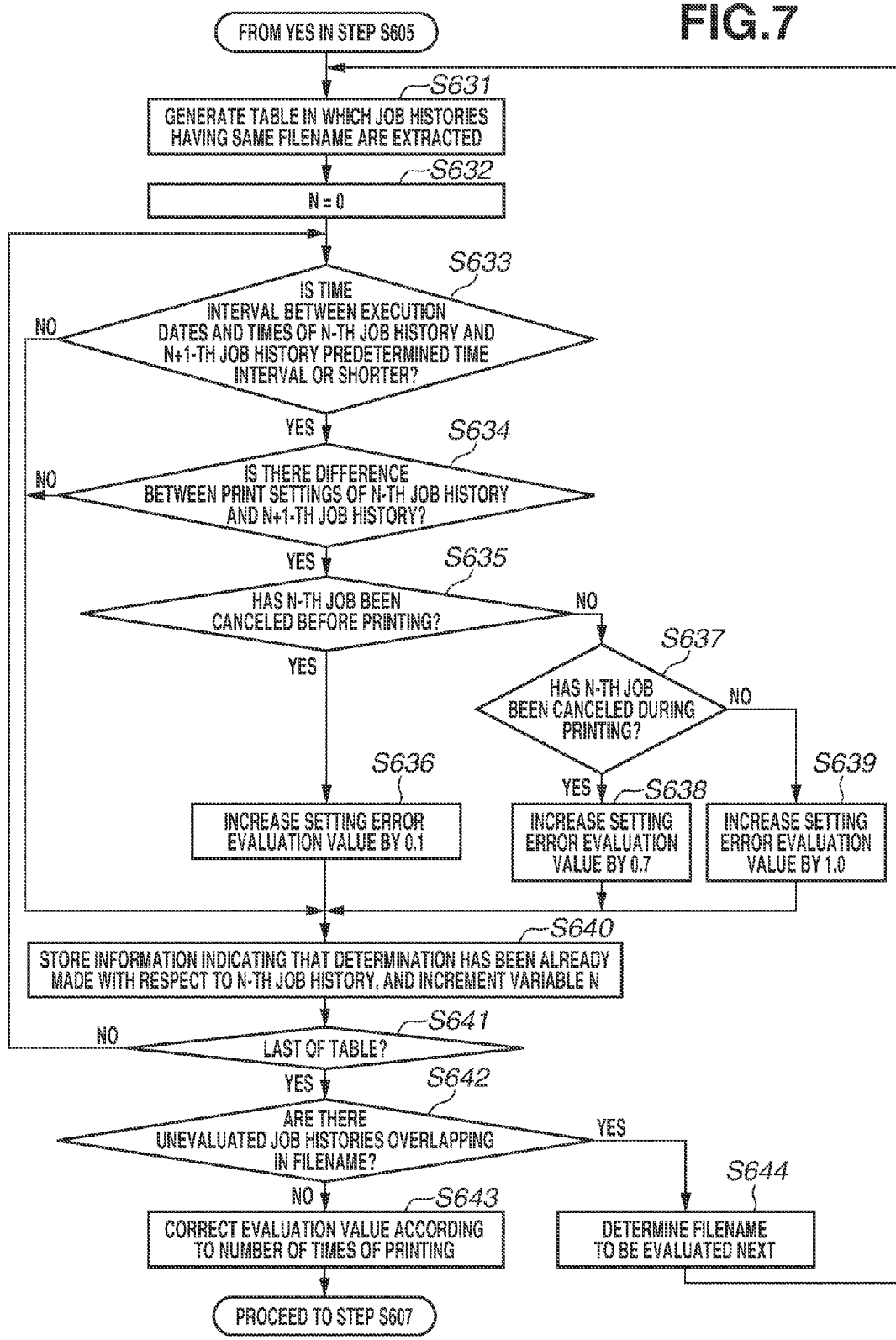
FIG. 7 is a flowchart illustrating control of the printing apparatus.

FIGS. 5 to 7 are flowcharts illustrating an operation of the MFP 101 that is started after the MFP 101 is started up. The CPU 111 of the MFP 101 executes the control program stored in the ROM 112 or the storage 114, by which each operation (step) illustrated in the flowcharts of FIGS. 5 to 7 is realized.

In step S501, the CPU 111 determines whether the print data is received from the external apparatus, such as the PC 102. If the print data is received (YES in step S501), the processing proceeds to step S502. If the print data is not received (NO in step S501), the processing proceeds to step S503.

In step S502, the CPU 111 stores the print data received in step S501 into a predetermined storage area of the storage 114. Upon completion of the storage, the processing returns to the process of step S501.

In step S503, the CPU 111 determines whether a user instruction for the hold printing is issued. If the hold printing function is selected from the main menu (not illustrated) (YES in step S503), the processing proceeds to step S504. If the hold printing function is not selected from the main menu (not illustrated) (NO in step S503), the processing proceeds to step S516.

In step S504, the CPU 111 displays the screen regarding the hold printing (not illustrated) on the operation unit 116. In step S505, the CPU 111 determines whether the instruction to print the print data is issued via the screen regarding the hold printing. If the instruction to start the printing is received by the CPU 111 with some print data selected as a print target (YES in step S505), the processing proceeds to step S508. If the instruction to start the printing is not received by the CPU 111 (NO in step S505), the processing proceeds to step S506.

In step S506, the CPU 111 determines whether an instruction to cancel the printing based on the print data is issued via the screen regarding the hold printing. If the instruction to cancel the printing is received by the CPU 111 with some print data selected as the print target (YES in step S506), the processing proceeds to step S507. If the instruction to cancel the printing is not received by the CPU 111 (NO in step S506), the processing returns to step S504, in which the CPU 111 waits for the user's operation. In step S507, the CPU 111 performs processing for canceling the printing. Then, the processing proceeds to step S515.

In step S508, the CPU 111 acquires the user ID of the user who has input the print job. The CPU 111 then searches the database of the individual setting information based on this user ID, and acquires the setting of the confirmation at the time of the printing that is associated with the user ID. If the acquired setting of the confirmation at the time of the printing is set to ON (YES in step S508), the processing proceeds to step S509. If the acquired setting of the confirmation at the time of the printing is not set to ON (if this setting is set to OFF) (NO in step S508), the processing proceeds to step S512.

In step S509, the CPU 111 performs the confirmation processing at the time of the printing, and the print processing. Assume that the confirmation processing with use of, for example, the above-described test printing function or preview function is performed as the confirmation processing at the time of the printing in step S509. If an instruction to start the printing is received via a screen regarding the confirmation processing, the CPU 111 generates the print job based on the print data that the MFP 101 has been instructed to print in step S505, and starts the print processing based on the print job.

In step S510, the CPU 111 determines whether a cancel instruction is issued. If, while the confirmation processing at the time of the printing is in progress or the print processing is in progress, the instruction to cancel this printing is received (YES in step S510), the processing proceeds to step S507, in which the CPU 111 performs the processing for canceling the printing. If, while the confirmation processing at the time of the printing is in progress or the print processing is in progress, the instruction to cancel this printing is not received (NO in step S510), the processing proceeds to step S511.

In step S511, the CPU 111 determines whether the print processing has been completed. If the print processing has been completed (YES in step S511), the processing proceeds to step S515. If the print processing has not been completed (NO in step S511), the processing returns to step S509.

In step S512, the CPU 111 generates the print job based on the print data that the MFP 101 has been instructed to print in step S505, and performs the print processing based on the print job. In step S513, the CPU 111 determines whether a cancel instruction is issued. If, while the print processing is in progress, the instruction to cancel this printing is received (YES in step S513), the processing proceeds to step S507, in which the CPU 111 performs the processing for canceling the printing. On the other hand, if, while the print processing is in progress, the instruction to cancel this printing is not received (NO in step S513), the processing proceeds to step S514.

In step S514, the CPU 111 determines whether the print processing has been completed. If the print processing has been completed (YES in step S514), the processing proceeds to step S515. If the print processing has not been completed (NO in step S514), the processing returns to step S512, in which the CPU 111 performs the rest of the print processing.

In step S515, the CPU 111 records a job history (also referred to as history data) of the print job. The job history includes the user ID, a filename, and information indicating a date and time when the job has been carried out. Further, the job history also includes the print settings, an execution result (OK or failed), and the number of output sheets. If the printing has been normally completed, OK is stored in the execution result. If the printing has been canceled before the start of the printing, a result that the printing has been canceled before the start of the printing is stored in the execution result. If the printing has been canceled during the printing, a result that the printing has been canceled during the printing is stored in the execution result. The job history of the print job that is stored in step S515 is referred to during processing for updating the setting of the confirmation at the time of the printing (described below) as necessary.

In step S516, the CPU 111 determines whether an instruction to power off the MFP 101 is received. If the instruction to power off the MFP 101 is received (YES in step S516), the CPU 111 ends the series of processes and powers off the MFP 101. If the instruction to power off the MFP 101 is not received (NO in step S516), the processing proceeds to step S517. The instruction to power off the MFP 101 may be pressing of a power button (not illustrated) in the operation unit 116 or may be a shutdown instruction via the network 100.

In step S517, the CPU 111 determines whether the MFP 101 has reached a timing of updating the setting of the confirmation at the time of the printing. If a preset predetermined time has come, the CPU 111 determines that the MFP 101 has reached the timing of updating the setting of the confirmation at the time of the printing (YES in step S517). Then, the processing proceeds to the update processing in step S518. If the predetermined time has not come, the CPU 111 determines that the MFP 101 has not reached the timing of updating the setting of the confirmation at the time of the printing (NO in step S517). Then, the processing returns to step S501.

The predetermined time may be set in advance when the MFP 101 is shipped from a factory or may be set by the administrator of the MFP 101. The update processing can be performed during, for example, a nighttime period, in which the MFP 101 is usually not used.

The MFP 101 may also be configured to allow the administrator to manually update the setting of the confirmation at the time of the printing. In this case, the CPU 111 performs the processing in step S518 in a case where an update instruction is issued from the administrator.

In step S518, the CPU 111 performs the processing for updating the print confirmation setting based on the job histories. FIG. 6 is a flowchart illustrating the processing in step S518 in detail.

In step S600, the CPU 111 determines a user ID targeted for a search. Assume that the CPU 111 refers to the user management data 200, and performs processes of steps S602 to S611 (described below) for all of the user IDs managed in the user management data 200, starting from the first user ID in order.

In step S601, the CPU 111 searches the database of the individual setting information based on the user ID targeted for the search that has been acquired in step S600, and acquires the print confirmation setting associated with the user ID.

In step S602, the CPU 111 extracts histories of jobs that the MFP 101 has been instructed to carry out with the user ID targeted for the search that has been acquired in step S600 from a plurality of job histories stored in the storage 114.

In step S603, the CPU 111 determines whether there is a job history corresponding to the user ID targeted for the search that has been acquired in step S600. If there is a job history corresponding to the user ID targeted for the search that has been acquired in step S600 (YES in step S603), the processing proceeds to step S604. If there is no job history corresponding to the user ID targeted for the search that has been acquired in step S600 (NO in step S603), the processing proceeds to step S609.

FIGS. 8A to 8C are diagrams with reference to which processing for determining an evaluation value will be described with a specific example cited therefor. FIG. 8A illustrates an example of a result of extracting job histories corresponding to some user IDs. FIG. 8A illustrates an example in a case where twenty job histories are extracted as histories of jobs carried out by the same user.

In step S604, the CPU 111 extracts job histories overlapping in filename from the job histories extracted in step S602. In step S605, the CPU 111 determines whether there are job histories overlapping in filename. If there are job histories overlapping in filename (YES in step S605), the processing proceeds to step S606. If there are no job histories overlapping in filename (NO in step S605), the processing proceeds to step S609.

FIG. 8B illustrates an example of an extraction result of further extracting the job histories overlapping in filename from the job histories extracted in step S603. FIG. 8B illustrates that job histories having a filename "explanatory material.docx" and job histories having a filename "readme.txt" are extracted as the job histories overlapping in filename.

In step S606, the CPU 111 performs the processing for determining the evaluation value regarding the print error based on the job histories overlapping in filename that have been extracted in step S604. FIG. 7 is a flowchart illustrating the processing in step S606 in detail.

In step S631, the CPU 111 generates a table in which the job histories having the same filename are extracted among the job histories overlapping in filename that have been extracted in step S604. Assume that the job histories are sorted in ascending order of the execution date and time in the table generated in step S631. Assume that the CPU 111 repeats processes of steps S632 to S641 (described below) until completing the determination with respect to the job histories overlapping in filename that have been extracted in step S631.

Processing subsequent thereto will be described, by way of example, based on FIG. 8C (1), which is a table in which the job histories having filenames that match "explanatory material.docx" are further extracted from the execution result list illustrated in FIG. 8B.

In step S632, the CPU 111 initializes a variable N to zero. In step S633, the CPU 111 refers to an N-th job history and an N+1-th job history, and determines whether a time interval between execution dates and times of these job histories is a predetermined time interval or shorter (e.g., five minutes or shorter). If the time interval between the execution dates and times of the N-th job history and the N+1-th job history is the predetermined time interval or shorter (YES in step S633), the processing proceeds to step S634. If the time interval between the execution dates and times of the N-th job history and the N+1-th job history is not the predetermined time interval or shorter (NO in step S633), the processing proceeds to step S640.

For example, taking a look at execution dates and times of the zero-th job history and the first job history in FIG. 8C (1), a time interval therebetween is three minutes and is determined to be the predetermined time period or shorter. A time interval between the first job history and the second job history also is three minutes and also is determined to be the predetermined time period or shorter. A time interval between the second job history and the third job history is 31680 minutes (22 days) and is determined not to be the predetermined time interval or shorter.

In step S634, the CPU 111 determines whether there is a difference between print settings stored in the N-th job history and print settings stored in the N+1-th job history. If there is a difference between the print settings stored in the N-th job history and the print settings stored in the N+1-th job history (YES in step S634), the processing proceeds to step S635. If there is no difference between the print settings stored in the N-th job history and the print settings stored in the N+1-th job history (NO in step S634), the processing proceeds to step S640.

For example, taking a look at print settings of the zero-th job history and the first job history in FIG. 8C (1), their respective color settings and N-in-one settings in the print settings are different from each other, and thus the CPU 111 determines that there is a difference between the print settings. Taking a look at print settings of the first job history and the second job history, both are the monochrome setting and the 2-in-1 setting, and thus the CPU 111 determines that there is no difference between the print settings.

The MFP 101 may be configured in such a manner that, in the process of step S634, the CPU 111 compares only items affecting an appearance of a final product, such as the N-in-one setting, the color setting, and finishing processing, among the print settings. For example, if the number of copies has been changed, it is considered that a necessity of an additional printed product has arisen. In such a case, it is less likely that the print error has occurred, and thus, the MFP 101 also can be configured in such a manner that the CPU 111 excludes items not affecting the appearance of the printed product, such as the number of copies, from comparison targets.

In step S635, the CPU 111 refers to the execution result of the N-th job history and determines whether the N-th job has been canceled before the printing. If a cancellation before the printing is recorded as the execution result of the N-th job history (YES in step S635), the processing proceeds to step S636. If the cancellation before the execution of the printing is not recorded as the execution result of the N-th job history (NO in step S635), the processing proceeds to step S637.

In step S636, the CPU 111 increases the setting error evaluation value by 0.1. Then, the processing proceeds to step S640. In step S637, the CPU 111 refers to the execution result of the N-th job history and determines whether the N-th job has been canceled during the printing. If a cancellation during the printing is recorded as the execution result of the N-th job history (YES in step S637), the processing proceeds to step S638. If the cancellation during the printing is not recorded as the execution result of the N-th job history (NO in step S637), the processing proceeds to step S639.

In step S638, the CPU 111 increases the setting error evaluation value by 0.7. Then, the processing proceeds to step S640. In step S639, the CPU 111 increases the setting error evaluation value by 1.0. Then, the processing proceeds to step S640.

The processes of steps S635 to S639 allow the CPU 111 to, even in a case where it is suspected that the print job has been carried out again due to the setting error, estimate any of whether the error has been noticed before the printing, whether the error has been noticed during the printing, and whether the error has been noticed after completion of the printing from the job history, and vary a range of a change in the evaluation value.

For example, in the case of the zero-th job history and the first job history in FIG. 8C (1), the cancellation in during the printing is recorded as the zero-th job history, which leads to the increase in the evaluation value by 0.7.

In step S640, the CPU 111 stores information indicating that the determination has been already made with respect to the N-th job history in association with the extraction result acquired in step S604, and increments the variable N. In step S641, the CPU 111 determines whether the determination has been completed as far as the last job history in the table generated in step S631. If the determination has been completed as far as the last job history in the table generated in step S631 (YES in step S641), the processing proceeds to step S642. If the determination has not been completed as far as the last job history in the table generated in step S631 (NO in step S641), the processing returns to step S633.

For example, in the case of FIG. 8C (1), first, the processes of steps S633 to S639 are performed on the zero-th job history and the first job history. Next, the variable N is incremented in step S640, and the processes of steps S633 to S639 are performed on the first job history and the second job history. Lastly, the processes of steps S633 to S639 are performed on the second job history and the third job history, which causes the present flow to reach the last of the table, thereby completing the determination processing on the job histories having the same filename.

In step S642, the CPU 111 determines whether there are unevaluated job histories overlapping in filename. If there is a job history with respect to which the determination has not been made yet in the extraction result acquired in step S604, the CPU 111 determines that there are unevaluated job histories overlapping in filename (YES in step S642), and then the processing proceeds to step S644. If there is no job history with respect to which the determination has not been made yet in the extraction result acquired in step S604, the CPU 111 determines that there are no unevaluated job histories overlapping in filename (NO in step S642), and then the processing proceeds to step S643.

In step S644, the CPU 111 determines a filename with respect to which the determination should be made next. Then, the processing proceeds to the process of step S631.

For example, in the case of the overlapping job histories illustrated in FIG. 8B by way of example, the processing has been completed with respect to the plurality of job histories in which "explanatory material.docx" is stored as the filename in the first loop processing. On the other hand, the processing has not been completed with respect to the plurality of job histories in which "readme.txt" is stored as the filename, and thus the CPU 111 determines that the filename with respect to which the determination should be made next is "readme.txt". The processing then proceeds to step S631.

FIG. 8C (2) illustrates a table in which the job histories having filenames that match "readme.txt" are extracted. In such a case, the zero-th job history and the first job history satisfy the condition that the execution time interval is the predetermined time interval or shorter but have no difference in the print settings therebetween, and thus, the setting error evaluation value is not increased. Accordingly, in a case where the determination has been made with respect to all of the job histories illustrated in FIG. 8A, 0.7 is acquired as the evaluation value.

In step S643, the CPU 111 corrects the setting error evaluation value according to the number of times of the printing carried out by the user. For example, the CPU 111 determines a rate of the occurrence of the setting error per time of the printing by dividing the setting error evaluation value by the number of times of the printing. Then, the processing proceeds to step S607. For example, in the case of FIGS. 8A to 8C by way of example, this correction is calculated as the evaluation value 0.7/the number of times of the printing 20, and the evaluation value is corrected to 0.035.

Returning to the description of FIG. 6, in step S607, the CPU 111 determines whether the evaluation value determined in step S606 exceeds a threshold value (e.g., 0.1). If the evaluation value exceeds the threshold value (YES in step S607), the processing proceeds to step S608. If the evaluation value is the threshold value or lower (NO in step S607), the processing proceeds to step S609.

The threshold value for determining a rerun may be set in advance when the MFP 101 is shipped from the factory or may be set by the administrator of the MFP 101. In this case, the MFP 101 may be configured in such a manner that the administrator directly inputs the value of the threshold value, or may be configured in such a manner that the administrator sets the threshold value by selecting a desired level from several types of levels prepared in advance (for example, "high", "middle", and "low"). In such a case, the CPU 111 internally changes the threshold value according to the selection by the administrator.

In step S608, the CPU 111 searches the database of the individual setting information based on the user ID acquired in step S600, and sets the setting at the time of the confirmation of the printing that is associated with the user ID to ON. On the other hand, in step S609, the CPU 111 searches the database of the individual setting information based on the user ID acquired in step S600, and sets the setting at the time of the confirmation of the printing that is associated with the user ID to OFF.

The setting at the time of the confirmation of the printing that has been set in step S608 or S609 is referred to during the above-described process of step S508. Accordingly, whether to make the confirmation at the time of the printing can be switched for each of the users when the user issues the print instruction.

In step S610, the CPU 111 determines whether the print confirmation setting before the update that has been acquired in step S601 and the print confirmation setting updated in step S608 or S609 are different from each other. If they are different from each other (YES in step S610), the processing proceeds to step S611. If they are not different from each other (NO in step S610), the processing proceeds to step S612 while skipping step S611.

In step S611, the CPU 111 notifies the user that the print confirmation setting has been changed. For example, in step S611, the CPU 111 transmits an electronic mail indicating that the print confirmation setting has been changed to the electronic mail address stored in association with the user ID. For example, if the print confirmation setting has been changed from OFF to ON, the CPU 111 transmits an electronic mail reading, for example, "the confirmation at the time of the printing has been changed to ON to prevent or reduce print errors". On the other hand, for example, if the print confirmation setting has been changed from ON to OFF, the CPU 111 transmits an electronic mail reading, for example, "the confirmation at the time of the printing has been changed to OFF because print errors have reduced".

Figure 9:
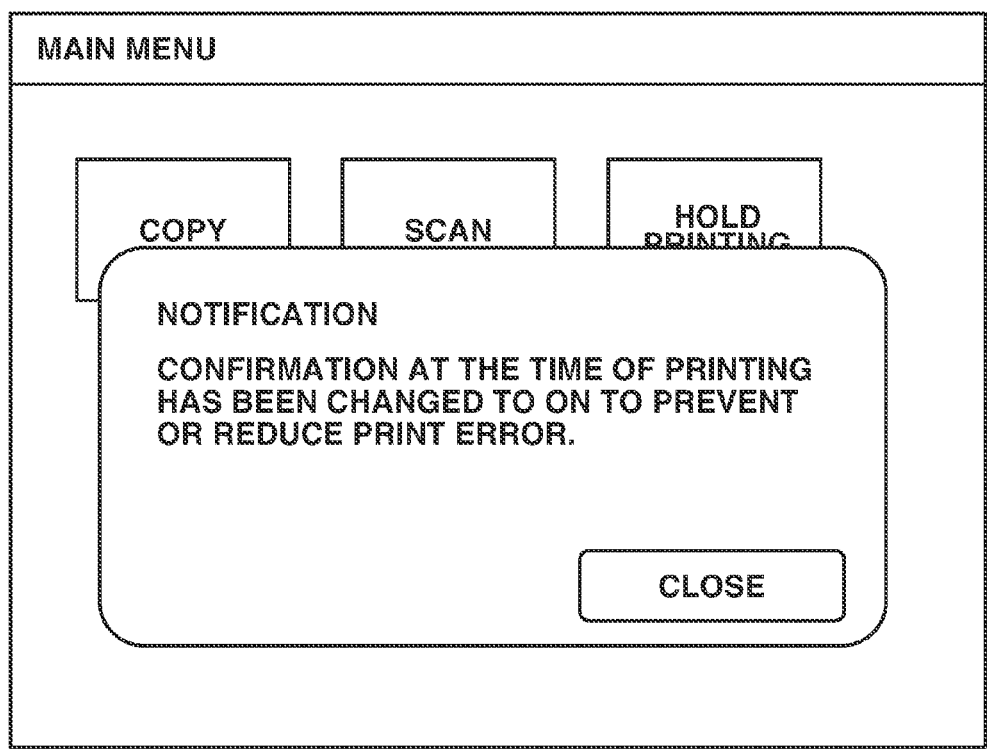
FIG. 9 illustrates one example of a screen displayed on the operation unit.

The method for notifying the user is not limited thereto. For example, the MFP 101 may be configured in such a manner that the user is notified of the message indicating the change when logging into the MFP 101. FIG. 9 illustrates one example of a screen displayed on the operation unit 116. The CPU 111 stores information indicating that the print confirmation setting has been changed as information included in the notification at the time of the login that is associated with the user ID. Further, when the user logs into the MFP 101, the CPU 111 displays the information included in the notification at the time of the login that is associated with this user ID, thereby being able to notify the user that the print confirmation setting has been changed. FIG. 9 illustrates an example when the CPU 111 notifies the user that the print confirmation setting has been changed to ON at the time of the login.

In step S612, the CPU 111 determines whether the determination about the print error has been completed with respect to all of the users. If the determination has been completed with respect to all of the users managed in the user information data 200 (YES in step S612), the series of processes is ended, and the processing returns to step S501. On the other hand, if the determination has not been completed with respect to all of the users managed in the user information data 200 (NO in step S612), the processing returns to step S600, from which the CPU 111 makes the determination about the print error with respect to the next user.

In the above-described manner, in the present embodiment, the evaluation value for evaluating a degree to which the user is prone to the print error can be determined from the histories of the jobs carried out by the user, and the setting of the confirmation at the time of the printing can be changed according to whether the evaluation value exceeds the threshold value. Therefore, the present embodiment allows the user who relatively highly likely makes the print setting error to prevent or reduce print errors, while allowing the user who relatively less likely makes the print setting error to advance the printing without being bothered with the confirmation at the time of the printing.

<Exemplary Modification>

Figure 10:
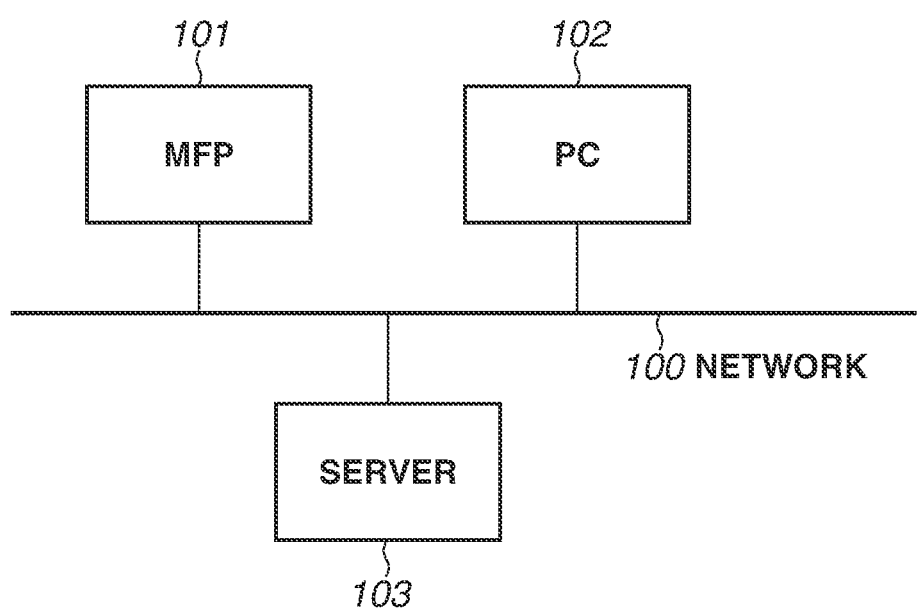
FIG. 10 is a block diagram illustrating a modification of the printing system.

FIG. 10 illustrates a printing system according to a modification of the first embodiment. The MFP 101 and the PC 102 each have a configuration similar to the first embodiment. The MFP 101, the PC 102, and a server 103 are communicably connected to one another in the network 100. The server 103 is one example of the information processing apparatus. The server 103 is a server apparatus for managing the settings and the information of the MFP 101. Assume that the server 103 stores therein contents similar to the user information table included in the MFP 101 and the database of the individual setting information included in the MFP 101.

In the modification, the MFP 101 and the server 103 cooperate with each other to perform the above-described flowcharts.

The MFP 101 performs the processes of steps S501 to S516 in the flowchart illustrated in FIG. 5. In performing the processing for storing the job history in step S515, the MFP 101 transmits this job history to the server 103 via the network 100. This transmission allows the server 103 side to perform the update processing in step S518.

The server 103 performs the processes of steps S517 and S518 in the flowchart illustrated in FIG. 5. Further, upon completing the update processing indicated in step S518, the server 103 transmits the setting of the confirmation at the time of the printing that has been changed according to the change processing to the MFP 101. The MFP 101 that has received the setting of the confirmation at the time of the printing from the server 103 applies this change to the database of the individual setting information based on the received setting.

In the above-described manner, the processing similar to the first embodiment can be also performed under the cooperation between the MFP 101 and the server 103. In such a case, the calculations of the various kinds of evaluations regarding the update of the setting of the confirmation at the time of the printing can be performed on the server side, whereby the processing for the evaluations based on the job histories can be performed without imposing a load accompanying the calculations of the various kinds of evaluations on the MFP 101.

The present modification can be also applied to such a configuration that the server 103 and a printing apparatus configured as in the MFP 101 are connected to each other. In such a case, the above-described effects can be achieved by configuring the printing system in such a manner that the server 103 collects the job histories from each of the printing apparatuses and performs the processing for each of the printing apparatuses.

The present modification can be also applied to such a configuration that a plurality of printing apparatuses configured as in the MFP 101 is connected to each other or one another. In such a case, any one of the printing apparatuses operates as the server that collects the job histories, and the other printing apparatus(es) transmit(s) the job histories to the printing apparatus that operates as this server. The printing apparatus operating as the server performs the processing on the job histories received from the other printing apparatus(es) in addition to performing the processing on its own job histories as in the first embodiment.

In the first embodiment and the modification thereof, the determination of the evaluation value has been described, by way of example, assuming that the evaluation value evaluating whether to set the confirmation at the time of the printing is determined from all of the stored job histories, but is not limited thereto. For example, the first embodiment and the modification thereof may be configured in such a manner that the evaluation value is calculated with the search targets narrowed down only to job histories within a predetermined time period from the current time.

Furthermore, in the first embodiment and the modification thereof, the MFP 101 that prints the image onto the sheet has been exemplarily described as one example of the printing apparatus, but the printing apparatus is not limited thereto. The first embodiment and the modification thereof also can be applied to, for example, a printing apparatus that fabricates a three-dimensional output product based on input data, such as a three-dimensional (3D) printer.

Other Embodiments

Embodiment(s) also can be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present embodiments, print errors can be prevented or reduced without impairing the user's convenience, by switching whether to cause the user to perform the confirmation operation based on the user's print histories.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2016-087440, filed Apr. 25, 2016, which is hereby incorporated by reference herein in its entirety.

What is claimed is:

1. A printing system comprising:
   one or more processors; and
   memory storing instructions that, when executed by the one or more processors, cause the printing system to perform operations including:
   causing history data about a print job to be stored into storage,
   determining an evaluation value regarding a print setting error of a user based on the history data about the print job that is stored in the storage, and determining whether to cause the user to perform confirmation processing at a time of the printing according to whether the determined evaluation value exceeds a predetermined threshold value,
   prompting, in response to it being determined that the determined evaluation value exceeds the predetermined threshold value, to the user a prompt to perform the confirmation processing at the time of the printing, and
   conditioning the printing based on a response, received from the user to the prompting, indicating that the user has performed the confirmation processing at the time of printing.

2. The printing system according to claim 1, wherein executing the instructions further causes the printing system to perform operations including changing a setting of whether to prompt the user to perform the confirmation processing according to the exceeds the predetermined threshold value determination.

3. The printing system according to claim 2, wherein executing the instructions further causes the printing system to perform operations including notifying the user of the change in the setting.

4. The printing system according to claim 3, wherein notifying includes transmitting a notification indicating the change in the setting with use of an electronic mail.

5. The printing system according to claim 3, wherein, upon condition that the user logs into a printing apparatus included in the printing system, notifying includes displaying a notification regarding the change in the setting on a display included in the printing apparatus.

6. The printing system according to claim 2, further comprising:
   a printing apparatus; and
   a server apparatus that includes the one or more processors.

7. The printing system according to claim 1, wherein, based on the history data stored in the storage, determining the evaluation value includes changing the evaluation value of the print setting error upon condition that a same user has carried out a plurality of print jobs overlapping in filename within a predetermined time period and a print setting has been changed between or among overlapping print jobs.

8. The printing system according to claim 7, wherein, even upon condition that the print setting has been changed between or among the overlapping print jobs, determining the evaluation value incudes reducing a range of the change in the evaluation value of the print setting error upon condition that one of the overlapping print jobs has been canceled, compared with the evaluation value of the print setting error upon condition that the overlapping print jobs have not been canceled.

9. The printing system according to claim 8, wherein determining the evaluation value incudes further reducing the range of the change in the evaluation value of the print setting error upon condition that the one of the overlapping print jobs has been canceled and the one of the overlapping print jobs has been canceled before execution of the printing, compared with the evaluation value of the print setting error upon condition that the one of the overlapping print jobs has been canceled during execution of the printing.

10. The printing system according to claim 1, wherein determining the evaluation value includes weighing the evaluation value based on the number of print jobs carried out by the user.

11. The printing system according to claim 1, wherein the predetermined threshold value can be changed by an administrator of the printing system.

12. The printing system according to claim 1, wherein, with reference to the history data and based on a fact that a same user has carried out a plurality of print jobs overlapping in filename within a predetermined time period and a print setting has been changed between or among these overlapping print jobs, determining whether to cause the user includes determining to cause the user who has carried out the overlapping print jobs to perform the confirmation processing at the time of the printing.

13. The printing system according to claim 1, wherein, in a case that the prompt indicates that the user is to perform a test printing as the confirmation processing and the response received from the user indicates that the user has performed the test printing, executing the instructions further causes the printing system to perform operations including printing.

14. A method for controlling a printing system, the method comprising:
   causing history data about a print job to be stored into storage;
   determining an evaluation value regarding a print setting error of a user based on the history data about the print job that is stored in the storage, and determining whether to cause the user to perform confirmation processing at a time of the printing according to whether the determined evaluation value exceeds a predetermined threshold value;

prompting, in response to it being determined that the determined evaluation value exceeds the predetermined threshold value, to the user a prompt to perform the confirmation processing at the time of the printing; and conditioning the printing based on a response, received from the user to the prompting, indicating that the user has performed the confirmation processing at the time of printing.

\* \* \* \* \*